United States Patent
Nandam et al.

(10) Patent No.: US 10,985,601 B2
(45) Date of Patent: Apr. 20, 2021

(54) METHODS, SYSTEMS AND DEVICES FOR EXTENDING RUN-TIMES OF UNINTERRUPTIBLE POWER SUPPLIES (UPSS)

(71) Applicant: Eaton Intelligent Power Limited, Dublin (IE)

(72) Inventors: Pradeep K. Nandam, Cary, NC (US); David G. Miller, Clayton, NC (US); Jeffery J. Pankau, Clayton, NC (US); Paul Michael Lukosius, Youngsville, NC (US); Thomas J. Savage, Nekoosa, WI (US)

(73) Assignee: Eaton Intelligent Power Limited, Dublin (IE)

( * ) Notice: Subject to any disclaimer, the term of this patent is extended or adjusted under 35 U.S.C. 154(b) by 108 days.

(21) Appl. No.: 16/242,236

(22) Filed: Jan. 8, 2019

(65) Prior Publication Data
US 2019/0214846 A1    Jul. 11, 2019

Related U.S. Application Data

(60) Provisional application No. 62/615,539, filed on Jan. 10, 2018.

(51) Int. Cl.
*H02J 7/00*     (2006.01)
*H02J 9/06*     (2006.01)

(52) U.S. Cl.
CPC ............ *H02J 9/061* (2013.01); *H02J 7/0068* (2013.01)

(58) Field of Classification Search
CPC .......... H02J 7/0068; H02J 9/062; H02J 9/061
See application file for complete search history.

(56) References Cited

U.S. PATENT DOCUMENTS

| | | | |
|---|---|---|---|
| 6,304,059 B1 * | 10/2001 | Chalasani | H02J 7/0018 320/118 |
| 7,872,374 B2 * | 1/2011 | Gottlieb | G01R 31/3648 307/66 |
| 9,166,434 B2 * | 10/2015 | Huang | H02J 2207/40 |
| 9,748,799 B2 | 8/2017 | Nandam et al. | |
| 9,859,751 B2 * | 1/2018 | Shin | H02J 7/34 |
| 2007/0217128 A1 * | 9/2007 | Johnson, Jr. | H05K 7/1492 361/622 |
| 2014/0208129 A1 * | 7/2014 | Morales | H02J 9/06 713/300 |
| 2014/0239964 A1 * | 8/2014 | Gach | G01R 31/36 324/433 |

(Continued)

*Primary Examiner* — Jared Fureman
*Assistant Examiner* — Esayas G Yeshaw
(74) *Attorney, Agent, or Firm* — Stanek Lemon Crouse & Meeks, PA

(57) ABSTRACT

A system for providing power is provided including an uninterruptible power supply (UPS) coupled to a first power source, the UPS including at least one battery therein; at least one external battery module (EBM) coupled to the UPS and a second power source, the second power source being different and separate from the first power source. Each of the at least one EBMs include at least one battery string; and a super charger coupled to the at least one battery string and the at least one battery in the UPS, the super charger being configured to charge the at least one battery string and the at least one battery in the UPS when power from the first power source is removed. EBMs and UPSs are also provided herein.

20 Claims, 4 Drawing Sheets

(56) References Cited

U.S. PATENT DOCUMENTS

| | | | | |
|---|---|---|---|---|
| 2015/0214770 A1* | 7/2015 | Chen | ................. | H02J 7/02 307/19 |
| 2015/0303695 A1* | 10/2015 | Perry | ................. | H02J 7/0013 307/80 |
| 2017/0222444 A1* | 8/2017 | Hijazi | ................. | H02J 7/0068 |
| 2017/0317510 A1* | 11/2017 | Banerjee | ................. | H02J 7/0045 |
| 2017/0358934 A1* | 12/2017 | Miller | ................. | H02J 7/007 |
| 2018/0175350 A1* | 6/2018 | Goitsuka | ................. | H01M 2/0262 |

* cited by examiner

METHODS, SYSTEMS AND DEVICES FOR EXTENDING RUN-TIMES OF UNINTERRUPTIBLE POWER SUPPLIES (UPSS)

CLAIM OF PRIORITY

The present application claims priority to U.S. Provisional Application No. 62/615,539, filed on Jan. 10, 2018, entitled Methods, Systems and Devices for Extending Run-times of Uninterruptible Power Supplies (UPSs), the content of which is hereby incorporated herein by reference as if set forth in its entirety.

FIELD

The inventive concept relates generally to uninterruptible power supplies (UPSs) and, more particularly, to external battery modules for use with UPSs.

BACKGROUND

Uninterruptible power supply (UPS) systems are commonly used in installations such as data centers, medical centers and industrial facilities. UPS systems may be used in such installations to provide backup power to maintain operation of computer, medical devices and other critical equipment in event of failure of a primary utility supply. These UPS systems commonly have an "on-line" configuration including a rectifier and inverter coupled by a DC link that is also coupled to a backup power source, such as a battery. Other UPS configurations may also be used, such as standby and line-interactive configurations.

External battery modules (EBMs) may be used to extend the run-time (back-up time) of UPSs. Some EBMs may also be smart and provide monitoring circuits to all the battery packs. Although these EBMs can offer extended run-times, EBMs are still limited to how much they can extend the run-time and also take up additional space and add cost.

SUMMARY

Some of embodiments of the present inventive concept provide a system for providing power, the system including an uninterruptible power supply (UPS) coupled to a first power source, the UPS including at least one battery therein; at least one external battery module (EBM) coupled to the UPS and a second power source, the second power source being different and separate from the first power source. Each of the at least one EBMs include at least one battery string; and a super charger coupled to the at least one battery string and the at least one battery in the UPS, the super charger being configured to charge the at least one battery string and the at least one battery in the UPS when power from the first power source is removed.

In further embodiments, each of the at least one EBMs may further include a communication circuit therein configured to communicate with the UPS and/or other EBMs.

In still further embodiments, each of the at least one EBMs may further include a plurality of battery strings and each of the plurality of battery strings may include a plurality of batteries.

In some embodiments, the UPS may be coupled to a load and backup power may be provided from the at least one EBM to the load when the power from the first power source is removed.

The further embodiments, an amount of available backup power from the at least one EBM may be increased due to presence of the super charger coupled to the second power source.

In still further embodiments, the system may include a single EBM and the single EBM may provide backup power to the UPS for a period of time exceeding a period time provided by a conventional EBM.

In some embodiments, the first and second power sources may be alternating current (AC) power sources.

Further embodiments of the present inventive concept provide EBMs and UPSs.

DETAILED DESCRIPTION

Figure 1:
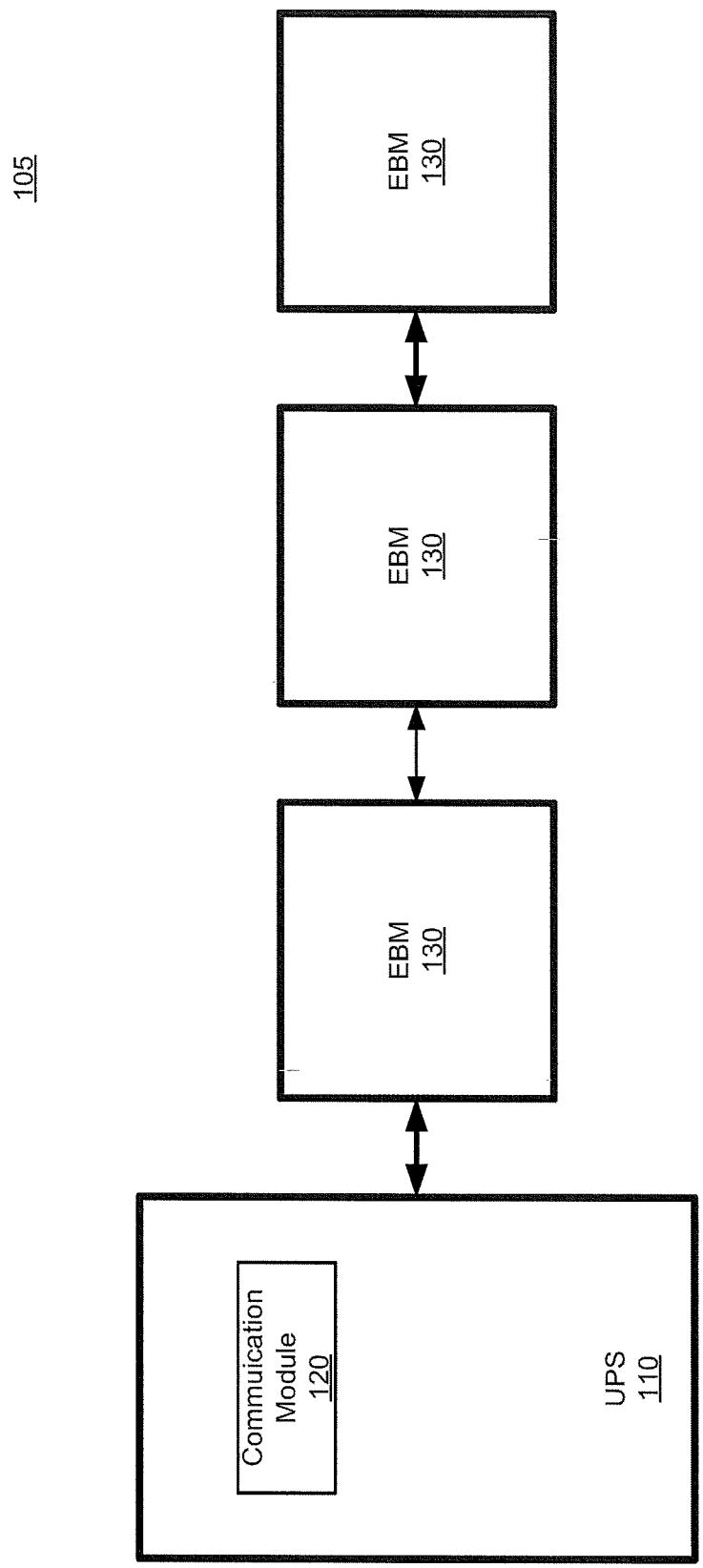
FIG. 1 is a block diagram of a system including an uninterruptible power supply (UPS) and a plurality of external battery modules (EBMs).

Specific example embodiments of the inventive concept now will be described with reference to the accompanying drawings. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive concept. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As discussed above, with a limited number of batteries, an uninterruptable power supply (UPS) can only provide a certain amount of backup power (additional run-time) depending on the size of the load connected to the UPS and the battery power available. To extend this run-time or backup time, customers use external batteries or external battery modules (EBMs). Although these EBMs do offer extended run-times, they too are limited in how much they can extend the run-time and also take up additional space and add cost.

Accordingly, some embodiments of the present inventive concept provide methods, systems and devices that allow extension of the UPS battery run-time using smart EBMs. Smart EBMs are discussed, for example, in commonly assigned U.S. Pat. No. 9,748,799, the disclosure of which is hereby incorporated herein by reference as if set forth in its entirety. As will be discussed herein, some embodiments of the present inventive concept use smart EBMs that are powered by a separate alternating current (AC) source. In particular, a smart EBM can support a super charger, which can be used to charge the batteries while the UPS is in battery mode (backup) and is supporting the load with battery power. Significant improvement in backup time can be achieved depending on the capacity of the super charger. As will be discussed further herein, using a super charger in accordance with embodiments of the present inventive concept may allow reduction in the number of EBMs needed for each UPS and, therefore, reduce the amount of space needed for the EBMs as well as the cost thereof.

As used herein, a "super charger" refers to a battery charger configured to charge batteries in the UPS and/or the EBM using an AC source that is not being used to power the UPS. In other words, as discussed below, first and second AC sources are present in the system. When power is lost from the first AC source that powers the UPS/Load, it is assumed that power is not lost from the second AC source. In embodiments discussed herein, the super charger is installed in the EBM Chassis, and the EBM's AC input is not derived from the UPS's outputs, and the EBM's AC input is separate from that of the UPS.

Referring now to FIG. 1, a basic block diagram of a system including multiple EBMs will be discussed. As illustrated in FIG. 1, the system 105 includes a UPS 110 and a plurality of EBMs 130 daisy chained together. As used herein, "daisy-chain" refers to connecting two or more devices together in a linear series. It will be understood that the configuration of FIG. 1 is provided for example purposes only and that embodiments of the present inventive concept are not limited the configuration thereof. For example, although three EBMs 130 are illustrated in FIG. 1, embodiments of the present inventive concept could include more or less than three EBMs without departing from the scope of the present inventive concept. In particular, one of the advantages provided by a super charger in accordance with embodiments of the present inventive concept is to reduce the number of EBMs needed to provide the same amount of back-up time. Thus, embodiments of the present inventive concept will typically have fewer EBMs than a conventional system.

To extend run-time (back-up time), UPSs 110 use EBMs 130. Conventional EBMs were typically "dumb," i.e. a chassis with a set number of battery strings (battery packs) without any intelligence. However, embodiments of the present inventive concept use smart EBMs 130.

Figure 2:
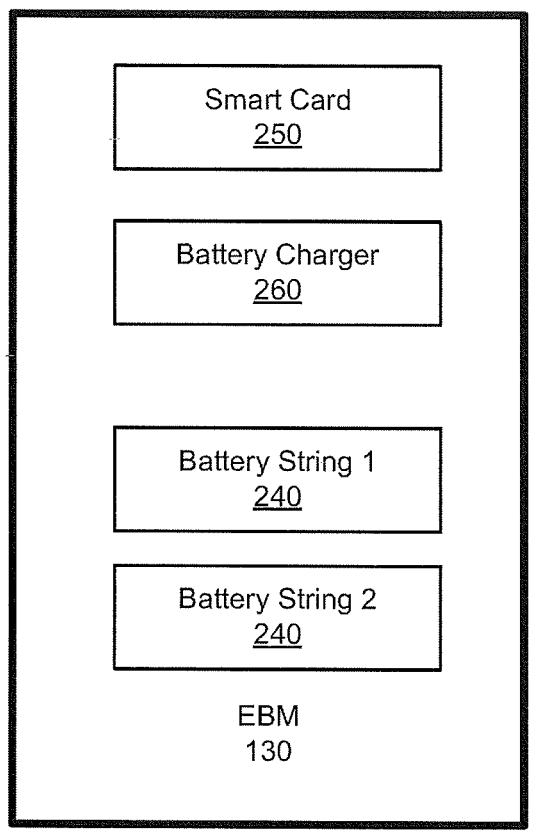
FIG. 2 is a more detailed block diagram of an example EBM.

Referring now to FIG. 2, EBMs 130 in accordance with some embodiments of the present inventive concept will be discussed. As illustrated in FIG. 2, the EBM 130 may include a plurality of battery strings, for example, battery strings 1 and 2 (240). In some embodiments, each of the battery strings 1 and 2 (240) may include two modules, each module including 5 batteries, thus, each EBM in FIG. 2 would have 20 batteries total. However, embodiments of the present inventive concept are not limited to this configuration. For example, some embodiments may include 12 battery strings including 24 total modules and a total of 120 batteries. As further illustrated in FIG. 2, EBMs in accordance with embodiments of the present inventive concept include a communications circuit, for example, a smart card 250 and a battery charger 260. The smart card 250 and the battery charger 260 may be positioned in corresponding slots in the EBM 130. As will be discussed in more detail below, the battery charger 260 is a super charger in accordance with embodiments discussed herein. More detailed embodiments of systems including UPSs, EBMs and battery chargers that may be used in accordance with embodiments of the present inventive concept are discussed in commonly assigned U.S. Pat. No. 9,748,799, which has been incorporated by reference above.

As discussed above, the system of FIG. 1 includes a UPS with more than one EBM. The additional EBMs add additional run-time when the UPS is on battery power. However, as discussed above, using a super charger in a smart EBM in accordance with embodiments discussed herein, the number of EBMs may be reduced saving space and cost as will be discussed below with respect to FIG. 3.

Figure 3:
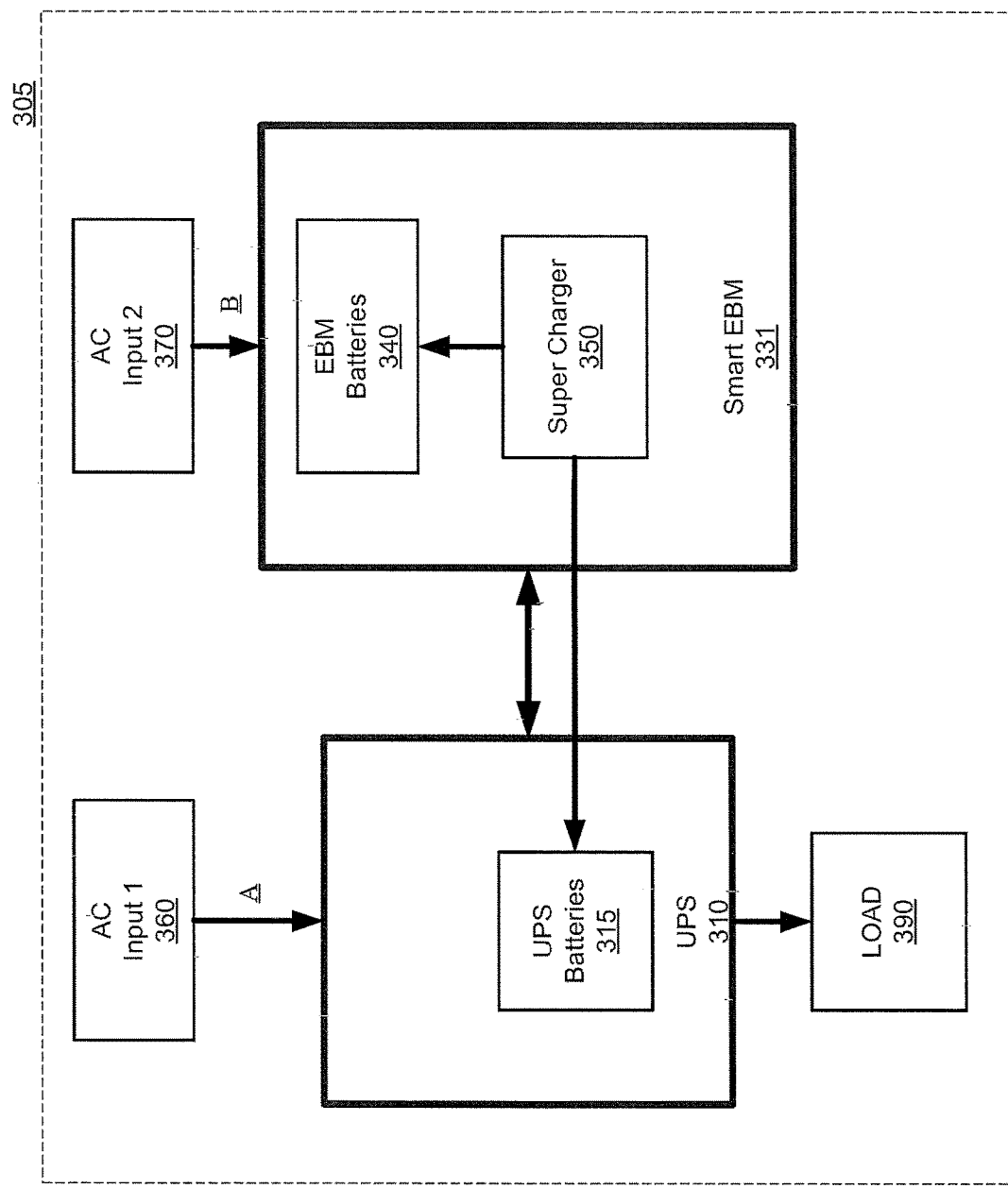
FIG. 3 is a block diagram of the system including a UPS and an EBM including a super charger in accordance with some embodiments of the present inventive concept.

Referring now to FIG. 3, a system including a smart EBM with a super charger in accordance with embodiments discussed herein will be discussed. As illustrated therein, the system 305 includes a UPS 310 coupled to a load 390 and a smart EBM 331 and first and second AC inputs 360 and 370, respectively. As illustrated in FIG. 3, only a single smart EBM 331 is included in the system 305 in contrast to the system of FIG. 1. It will be understood that more than one smart EBM may be included without departing from the scope of the present inventive concept; however, an advantage of the present inventive concept is a reduction in the number of EBMs needed to support the UPS/Load for a given back-up time requirement.

Referring again to FIG. 3, the UPS 310 may include one or more batteries 315 and may be coupled to a first of the AC inputs 360. The smart EBM 331 may include one or more battery strings 340 and a super charger 350 in accordance with embodiments discussed herein. The EBM 370 is coupled to a second of the AC inputs 370, which is separate and distinct from the first AC input 360. When power (A) from the first AC input 360 is lost, the super charger 350 that is coupled to the UPS batteries 315 and the EBM batteries 340 is configured to charge the batteries 315 and 340 using power B from the second AC input 370.

As is understood by those having skill in the art, UPSs 310 provide backup power to a load 390 when primary power (AC input 1 360) is lost. The amount of backup power is extended by the presence of one or more EBMs 331. Embodiments of the present inventive concept assume that when power is lost from the first AC input 360, that the second AC input 370 remains operational. If both AC inputs 360 and 370 fail, then the system 305 will operate as if it has a single EBM providing the defined backup for that EBM. Generally, a UPS has a five or ten minute internal battery 315 and each EBM 331 can extend the battery backup (run-time of UPS) from a half hour to an hour. However, using the super charger 350 in accordance with embodiments discussed herein, a single EBM 331 may be used to provide backup power for a much longer period of time than a conventional EBM without the super charger as discussed herein. For example, in some embodiments of the present inventive concept may be used to extend run-time for 2 or more hours. Thus, a single EBM 331 may be used to replace multiple EBMs, for example, two to four or more additional EBMs, saving both space and cost.

Figure 4:
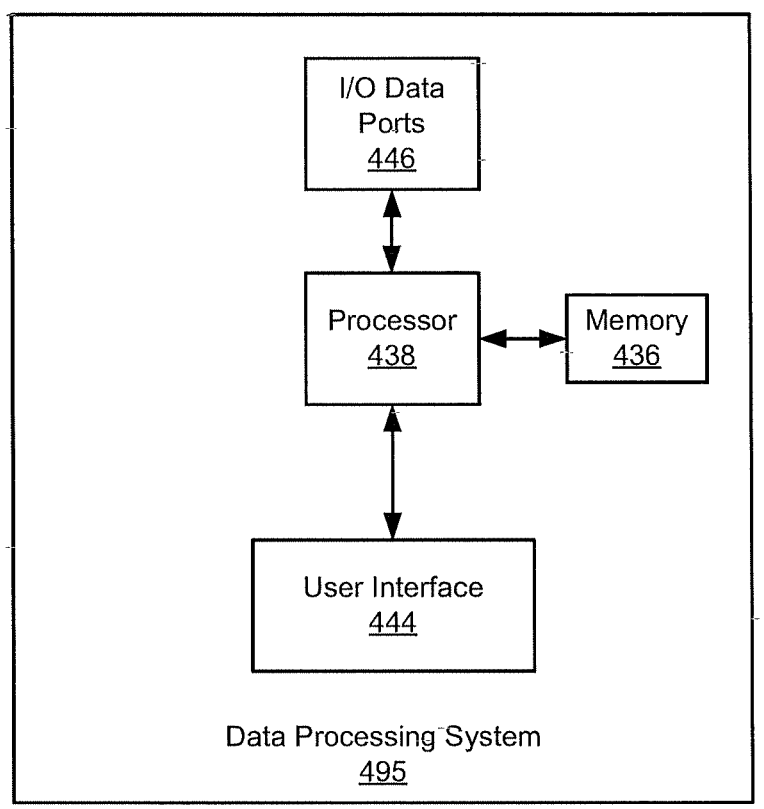
FIG. 4 is a block diagram illustrating a data processor that can be used in accordance with various embodiments of the present inventive concept.

Referring now to FIG. 4, a block diagram of a data processing system 495 that may be included in one of more of the UPSs or associated communication modules in accordance with some embodiments will be discussed. As illustrated in FIG. 4, the data processing system 495 may include a user interface 444, including, for example, input device(s) such as a man machine interface (MMI) including, but not limited to a keyboard or keypad and a touch screen; a display; a speaker and/or microphone; and a memory 436 that communicate with a processor 438. The data processing system 495 may further include I/O data port(s) 446 that also communicates with the processor 438. The I/O data ports 446 can be used to transfer information between the data processing system 495 and another computer system or a network, such as an Internet server, using, for example, an Internet Protocol (IP) connection. These components may be conventional components such as those used in many conventional data processing systems, which may be configured to operate as described herein.

Example embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stared in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a field programmable gate array (FPGA), or a programmed digital signal processor, a programmed logic controller (PLC), or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A system for providing power, the system comprising:
an uninterruptible power supply (UPS) coupled to a first power source, the UPS including at least one battery therein;
at least one external battery module (EBM) coupled to the UPS and a second power source, the second power source being different and separate from the first power source,
wherein each of the at least one EBMs comprises:
at least one battery string; and a super charger coupled to the at least one battery string and the at least one battery in the UPS, wherein the super charger charges the at least one battery string and the at least one battery in the UPS using power from the second power source when power from the first power source is removed.

2. The system of claim 1, wherein each of the at least one EBMs further comprises a communication circuit therein configured to communicate with the UPS and/or other EBMs.

3. The system of claim 1, wherein each of the at least one EBMs comprises a plurality of battery strings and each of the plurality of battery strings comprise a plurality of batteries.

4. The system of claim 1, wherein the UPS is coupled to a load and wherein backup power is provided from the at least one EBM to the load when the power from the first power source is removed.

5. The system of claim 4, wherein an amount of available backup power from the at least one EBM is increased due to presence of the super charger coupled to the second power source.

6. The system of claim 1, wherein the system including a single EBM provides backup power to the UPS for two or more hours.

7. The system of claim 1, wherein the first and second power sources are alternating current (AC) power sources.

8. An external battery module (EBM) for providing power, the EBM comprising:
   at least one battery string; and
   a super charger coupled to the at least one battery string and at least one battery of an uninterruptible power supply (UPS) connected to a first power source, the EBM being connected to a second power source, the second power source being different and separate from the first power source,
   wherein the super charger charges the at least one battery string and the at least one battery in the UPS using power from the second power source when power from the first power source is removed.

9. The EBM of claim 8, wherein the EBM further comprises a communication circuit therein configured to communicate with the UPS and/or other EBMs.

10. The EBM of claim 8, wherein the EBM comprises a plurality of battery strings and each of the plurality of battery strings comprise a plurality of batteries.

11. The EBM of claim 8, wherein the UPS is coupled to a load and wherein backup power is provided from the EBM to the load when the power from the first power source is removed.

12. The EBM of claim 11, wherein an amount of available backup power from the EBM is increased due to presence of the super charger coupled to the second power source.

13. The EBM of claim 8, wherein the EBM provides backup power to the UPS for two or more hours.

14. The EBM of claim 8, wherein the first and second power sources are alternating current (AC) power sources.

15. An uninterruptible power supply (UPS) comprising:
   at least one battery therein, the UPS being coupled to a first power source and at least one external battery module (EBM), the at least one EBM being coupled to a second power source, the second power source being different and separate from the first power source,
   wherein each of the at least one EBMs comprises:
   at least one battery string; and
   a super charger coupled to the at least one battery string and the at least one battery in the UPS, wherein the super charger charges the at least one battery string and the at least one battery in the UPS using the second power source when power from the first power source is removed.

16. The UPS of claim 15, wherein each of the at least one EBMs further comprises a communication circuit therein configured to communicate with the UPS and/or other EBMs.

17. The UPS of claim 15, wherein each of the at least one EBMs comprises a plurality of battery strings and each of the plurality of battery strings comprise a plurality of batteries.

18. The UPS of claim 15, wherein the UPS is coupled to a load and wherein backup power is provided from the at least one EBM to the load when the power from the first power source is removed.

19. The UPS of claim 18, wherein an amount of available backup power from the at least one EBM is increased due to presence of the super charger coupled to the second power source.

20. The UPS of claim 15, where the at least on EBM is a single EBM and provides backup power to the UPS for two or more hours.

* * * * *